United States Patent
Dutton

(10) Patent No.: US 10,876,874 B2
(45) Date of Patent: Dec. 29, 2020

(54) MULTI-PHASE CORIOLIS MEASUREMENT DEVICE AND METHOD

(71) Applicant: Micro Motion, Inc., Boulder, CO (US)

(72) Inventor: Robert E. Dutton, Louisville, CO (US)

(73) Assignee: Micro Motion, Inc., Boulder, CO (US)

( * ) Notice: Subject to any disclaimer, the term of this patent is extended or adjusted under 35 U.S.C. 154(b) by 273 days.

(21) Appl. No.: 16/061,511

(22) PCT Filed: Jan. 13, 2016

(86) PCT No.: PCT/US2016/013172
§ 371 (c)(1),
(2) Date: Jun. 12, 2018

(87) PCT Pub. No.: WO2017/123214
PCT Pub. Date: Jul. 20, 2017

(65) Prior Publication Data
US 2019/0170552 A1 Jun. 6, 2019

(51) Int. Cl.
*G01F 1/74* (2006.01)
*G01F 1/84* (2006.01)
(Continued)

(52) U.S. Cl.
CPC .............. *G01F 1/74* (2013.01); *G01F 1/8427* (2013.01); *G01F 1/8436* (2013.01);
(Continued)

(58) Field of Classification Search
None
See application file for complete search history.

(56) References Cited

U.S. PATENT DOCUMENTS 6,327,914 B1 * 12/2001 Dutton ................. G01F 1/8436
73/861.356
7,908,097 B2 * 3/2011 Duffill .................. G01F 1/8477
702/45
(Continued)

FOREIGN PATENT DOCUMENTS

DE 102013005166 A1 7/2014
WO WO2000019175 A1 4/2000
(Continued)

*Primary Examiner* — John C Kuan
(74) *Attorney, Agent, or Firm* — The Ollila Law Group LLC

(57) ABSTRACT

A method for improving flowmeter (5) reliability is provided. The flowmeter (5) has at least one flow tube (130, 130'), at least one pickoff sensor (170L, 170R) attached to the flow tube (130, 130'), at least one driver (180L, 180R) attached to the flow tube (130, 130'), and meter electronics (20) in communication with the at least one pickoff sensor (170L, 170R) and driver (180L, 180R). The method includes the steps of vibrating at least one flow tube (130, 130') in a drive mode vibration with the at least one driver (180L, 180R), and receiving a sensor signal based on a vibrational response to the drive mode vibration from the at least one pickoff sensor (170L, 170R). At least one flow variable is calculated. A pickoff sensor voltage is measured, and it is determined whether the pickoff sensor voltage is below a predetermined voltage threshold (304). The at least one flow variable is corrected during periods wherein the pickoff sensor voltage is below the predetermined voltage threshold (304).

18 Claims, 4 Drawing Sheets

(51) Int. Cl.
*G01F 15/02* (2006.01)
*G01F 25/00* (2006.01)

(52) U.S. Cl.
CPC .......... *G01F 15/024* (2013.01); *G01F 15/028* (2013.01); *G01F 1/8468* (2013.01); *G01F 1/8477* (2013.01); *G01F 25/0007* (2013.01)

(56) References Cited

U.S. PATENT DOCUMENTS

| | | | |
|---|---|---|---|
| 2002/0133307 A1* | 9/2002 | Maginnis | G01F 1/849 |
| | | | 702/100 |
| 2004/0200259 A1* | 10/2004 | Mattar | G01F 1/8436 |
| | | | 73/1.34 |
| 2005/0016292 A1 | 1/2005 | Dutton et al. | |
| 2008/0034890 A1 | 2/2008 | Barua et al. | |
| 2009/0143673 A1 | 6/2009 | Drost et al. | |
| 2010/0134304 A1 | 6/2010 | Weinstein et al. | |
| 2010/0170322 A1 | 7/2010 | Van Cleve et al. | |
| 2010/0299089 A1* | 11/2010 | Stack | G01F 1/74 |
| | | | 702/48 |
| 2011/0072912 A1* | 3/2011 | Loving | G01F 15/022 |
| | | | 73/861.356 |

FOREIGN PATENT DOCUMENTS

| | | | |
|---|---|---|---|
| WO | 2001031298 A2 | 5/2001 | |
| WO | 2008136825 A1 | 11/2008 | |
| WO | 2009071960 A1 | 6/2009 | |
| WO | 2009120223 A1 | 10/2009 | |

\* cited by examiner

MULTI-PHASE CORIOLIS MEASUREMENT DEVICE AND METHOD

FIELD OF THE INVENTION

The present invention relates to flowmeters, and more particularly, to Coriolis-based measurement methods that provide continuous monitoring and greater accuracy in quantitative and qualitative measurements of multi-phase fluid flow.

BACKGROUND

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flowmeter includes one or more conduits (also called flow tubes) that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by a driver, e.g., an electromechanical device, such as a voice coil-type actuator, that perturbs the conduit in a periodic fashion. Mass flow rate may be determined by measuring time delay or phase differences between motions at the transducer locations. Two or more such transducers (or pickoff sensors) are typically employed in order to measure a vibrational response of the flow tube or conduits, and are typically located at positions upstream and downstream of the driver. Instrumentation receives signals from the pickoff sensors and processes the signals in order to derive a mass flow rate measurement.

Flowmeters are used to perform mass flow rate measurements for a wide variety of fluid flows. One area in which Coriolis flowmeters can potentially be used is in the metering of oil and gas wells. The product of such wells can comprise a multiphase flow, including the oil or gas, but also including other components, such as water and/or solids, for example. It is, of course, highly desirable that the resulting metering be as accurate as possible, even for such multi-phase flows.

Coriolis meters offer high accuracy for single phase flows. However, when a Coriolis flowmeter is used to measure aerated fluids or fluids including entrained gas, the accuracy of the meter can be degraded. This is similarly true for flows having entrained solids and for mixed-phase fluid flows, such as when hydrocarbon fluids contain water.

Entrained gas is commonly present as bubbles in the flow material. The size of the bubbles can vary, depending on the amount of gas present, the pressure of the flow material, and the temperature. The extent of the decrease in performance is not only related to how much total gas is present, but also to the size of the individual gas bubbles in the flow. The size of the bubbles may affect the accuracy of the measurement.

A related, yet significant, source of error arises from fluid decoupling. Fluid decoupling results from the motion of the gas bubbles with respect to the liquid as a result of the vibration of the tube. The relative motion of the gas bubbles with respect to the liquid is driven by a buoyant force that is similar to the force that causes bubbles to rise to the surface under the influence of gravity. However, in a vibrating tube, it is the acceleration of the vibrating tube that causes the bubbles to move more than the acceleration of gravity. Because the dense fluid resists the acceleration more strongly than the light bubbles, the bubbles are accelerated in the same direction as the tube acceleration. The bubbles thus move faster and further than the flow tube and the bubble motion causes some of the fluid to move more slowly than the flow tube. This is the basis of the decoupling problem. As a result, the fluid that has the lower vibrational amplitude undergoes less Coriolis acceleration and imparts less Coriolis force on the flow tube than it would in the absence of bubbles. This results in the flow rate and density characteristics being under-reported (negative flow and density errors) when entrained gas is present. Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. Another influence on bubble mobility is the bubble size. The drag on a bubble is proportional to the surface area, whereas the buoyant force is proportional to the volume. Therefore, very small bubbles have a high drag-to-buoyancy ratio and tend to move with the fluid. Small bubbles subsequently cause small errors. Conversely, large bubbles tend not to move with the fluid and result in large errors. The same holds true for particles. Small particles tend to move with the fluid and cause small errors.

The density difference between the fluid and the gas is another factor that may contribute to flowmeter inaccuracy. The buoyant force is proportional to the difference in density between the fluid and the gas. A high pressure gas can have a high enough density to affect the buoyant force and reduce the decoupling effect. In addition, large bubbles occupy more volume, leading to true fluctuations in the density of the flow material. Due to the compressibility of a gas, the bubbles can change in gas quantity and yet not necessarily change in size. Conversely, if the pressure changes, the bubble size can correspondingly change, expanding as the pressure drops or shrinking as the pressure increases. This can also cause variations in the natural or resonant frequency of the flowmeter and thus variations in the actual two-phase density.

Overall, when a Coriolis meter experiences the onset of multi-phase flow, the sensor tube vibration is damped, resulting in the diminishment of flow tube vibratory amplitude. Typically, meter electronics compensate for this diminished amplitude by increasing the drive energy, or drive gain, in order to restore the amplitude. There is, however, a ceiling, as the maximum drive energy is limited for safety and other reasons. Therefore, as multi-phase flow becomes more pronounced, the relative measureable drive amplitude diminishes, which can no longer be augmented, as the driver is already performing at 100% drive gain. At this point, the meter electronics will continue to drive the tube vibration with diminished amplitude. In cases where multi-phase flow is even more severe, the amplitude of vibration becomes up to, and even greater than, an order of magnitude less than for single-phase flow. When this happens, the Coriolis transmitter has difficulty in locking onto the primary natural frequency of the sensor tubes and the density accuracy suffers, and often results in measurements that are less than the actual values. Decreases in tube amplitude also affect the mass measurement of the Coriolis meter. Since the flow tube's motion is attenuated, so are the Coriolis forces acting on the tube, which results in an under-measure of the mass flow rate of the gas-liquid mixture.

There remains a need in the art for a vibratory flowmeter that mitigates problems associated with increased drive gain due to multi-phase flow. There is a need to adjust flowmeter operation to tailor for differing types of multi-phase flow. Embodiments herein provide a flowmeter and related methods for determining when trustworthy readings are made. Embodiments herein provide a flowmeter and related methods for differentiating between types of multi-phase flow, and calculating flow accordingly. Embodiments herein provide a flowmeter and related methods that compensate for under-read factors associated with multiphase flow. Thus, advances in the art are made.

SUMMARY OF THE INVENTION

A method for improving flowmeter reliability is provided according to an embodiment. The flowmeter comprises at least one flow tube, at least one pickoff sensor attached to the flow tube, at least one driver attached to the flow tube, and meter electronics in communication with the at least one pickoff sensor and driver. The method comprises vibrating at least one flow tube in a drive mode vibration with the at least one driver and receiving a sensor signal based on a vibrational response to the drive mode vibration from the at least one pickoff sensor. At least one flow variable is calculated. A pickoff sensor voltage is measured, and it is determined whether the pickoff sensor voltage is below a predetermined voltage threshold. The at least one flow variable is corrected during periods wherein the pickoff sensor voltage is below the predetermined voltage threshold.

Meter electronics for a flowmeter configured to improve measurement reliability is provided according to an embodiment. The flowmeter comprises at least one flow tube, at least one pickoff sensor attached to the at least one flow tube, and at least one driver attached to the flow tube. The meter electronics are in communication with the at least one pickoff sensor and the at least one driver, and is configured to vibrate at least one flow tube in a drive mode vibration with the at least one driver, and receive a sensor signal based on a vibrational response to the drive mode vibration from the at least one pickoff sensor. The meter electronics is also configured to calculate at least one flow variable, measure a pickoff sensor voltage, and determine whether the pickoff sensor voltage is below a predetermined voltage threshold. The at least one flow variable is corrected during periods wherein the pickoff sensor voltage is below the predetermined voltage threshold.

Aspects of the Invention

A method for improving flowmeter reliability is provided according to an aspect. The flowmeter comprises at least one flow tube, at least one pickoff sensor attached to the flow tube, at least one driver attached to the flow tube, and meter electronics in communication with the at least one pickoff sensor and driver. The method comprises: vibrating at least one flow tube in a drive mode vibration with the at least one driver; receiving a sensor signal based on a vibrational response to the drive mode vibration from the at least one pickoff sensor; calculating at least one flow variable; measuring a pickoff sensor voltage; determining whether the pickoff sensor voltage is below a predetermined voltage threshold; and correcting the at least one flow variable during periods wherein the pickoff sensor voltage is below the predetermined voltage threshold.

Preferably, flow variables comprise at least one of: mass flow, volume flow, density, and water cut.

Preferably, the water cut is measured with a water cut analyzer in communication with the meter electronics.

Preferably, the method comprising correcting the at least one flow variable during periods wherein the pickoff sensor voltage is below the predetermined voltage threshold comprises an averaging.

Preferably, the averaging comprises the steps of: determining a point immediately prior to when the pickoff sensor voltage fell below the predetermined voltage threshold and determining a first at least one flow variable at this point; determining a point wherein the pickoff sensor voltage returned above the predetermined voltage threshold and determining a second at least one flow variable at this point; and calculating an average of the first and second at least one flow variables.

Preferably, the method comprises the steps of: correlating the pickoff sensor voltage with at least one of a mass flow rate under-read and a density under-read; deriving an under-read correction factor based on the correlation; and applying the under-read correction factor to the at least one flow variable.

Preferably, the method comprises the steps of: determining whether a fluid flow through the flowmeter is a multi-phase flow comprising predominantly a gas; determining whether a fluid flow through the flowmeter is a multi-phase flow comprising predominantly a liquid; applying a predominantly gas flow routine of the meter electronics if the fluid flow through the flowmeter is a multi-phase flow comprising predominantly a gas; and applying a predominantly liquid flow routine of the meter electronics if the fluid flow through the flowmeter is a multi-phase flow comprising predominantly a liquid.

Preferably, the method comprises the steps of: measuring a mass flow rate and a bulk density with the flowmeter; determining a gas density from a measured temperature, pressure, and gas composition; empirically determining a liquid density; and determining volumetric gas flow rate, volumetric liquid flow rate, and gas void fraction from the mass flow rate, the bulk density, the gas density, and the liquid density.

Preferably, the method comprises the steps of: determining a Lockhart-Martinelli parameter; and determining a mass flow rate of a gas phase and a mass flow rate of a liquid phase.

Preferably, the method comprises the steps of: determining whether the liquid comprises water; measuring liquid density with a water cut analyzer; determining the volumetric flow rate of an oil; and determining the volumetric flow rate of the liquid.

Meter electronics for a flowmeter configured to improve measurement reliability are provided according to an aspect. The flowmeter comprises: at least one flow tube; at least one pickoff sensor attached to the at least one flow tube; and at least one driver attached to the flow tube, wherein the meter electronics are in communication with the at least one pickoff sensor and the at least one driver. The meter electronics are configured to: vibrate at least one flow tube in a drive mode vibration with the at least one driver; receive a sensor signal based on a vibrational response to the drive mode vibration from the at least one pickoff sensor; calculate at least one flow variable; measure a pickoff sensor voltage; determine whether the pickoff sensor voltage is below a predetermined voltage threshold; and correct the at least one flow variable during periods wherein the pickoff sensor voltage is below the predetermined voltage threshold.

Preferably, the flow variables comprise at least one of: mass flow, volume flow, density, and water cut.

Preferably, the water cut is measured with a water cut analyzer in communication with the meter electronics.

Preferably, the meter electronics are configured to average at least one flow variable during periods wherein the pickoff sensor voltage is below the predetermined voltage threshold.

Preferably, the average comprises the calculated average of a first and a second flow variable, wherein: the first flow variable is a pickoff sensor voltage value determined at a point immediately prior to when the pickoff sensor voltage falls below the predetermined voltage threshold; and the second flow variable is a pickoff sensor voltage value determined at a point immediately after the pickoff sensor voltage returns above the predetermined voltage threshold.

Preferably, the pickoff sensor voltage is correlated with at least one of a mass flow rate under-read and a density under-read, wherein the meter electronics is configured to derive an under-read correction factor based on the correlation, and the under-read correction factor is applied to the at least one flow variable.

Preferably, the meter electronics is configured to: determine whether a fluid flow through the flowmeter is a multi-phase flow comprising predominantly a gas; determine whether a fluid flow through the flowmeter is a multi-phase flow comprising predominantly a liquid; apply a predominantly gas flow routine of the meter electronics if the fluid flow through the flowmeter is a multi-phase flow comprising predominantly a gas; and apply a predominantly liquid flow routine of the meter electronics if the fluid flow through the flowmeter is a multi-phase flow comprising predominantly a liquid.

Preferably, the meter electronics is configured to: measure a mass flow rate and a bulk density with the flowmeter; determine a gas density from a measured temperature, pressure, and gas composition; empirically determine a liquid density; and determine a volumetric gas flow rate, a volumetric liquid flow rate, and a gas void fraction from the mass flow rate, the bulk density, the gas density, and the liquid density.

Preferably, the meter electronics is configured to: determine a Lockhart-Martinelli parameter; and determine a mass flow rate of a gas phase and a mass flow rate of a liquid phase.

Preferably, the meter electronics is configured to: determine whether the liquid comprises water; measure the liquid density with a water cut analyzer; determine the volumetric flow rate of an oil; and determine the volumetric flow rate of the liquid.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
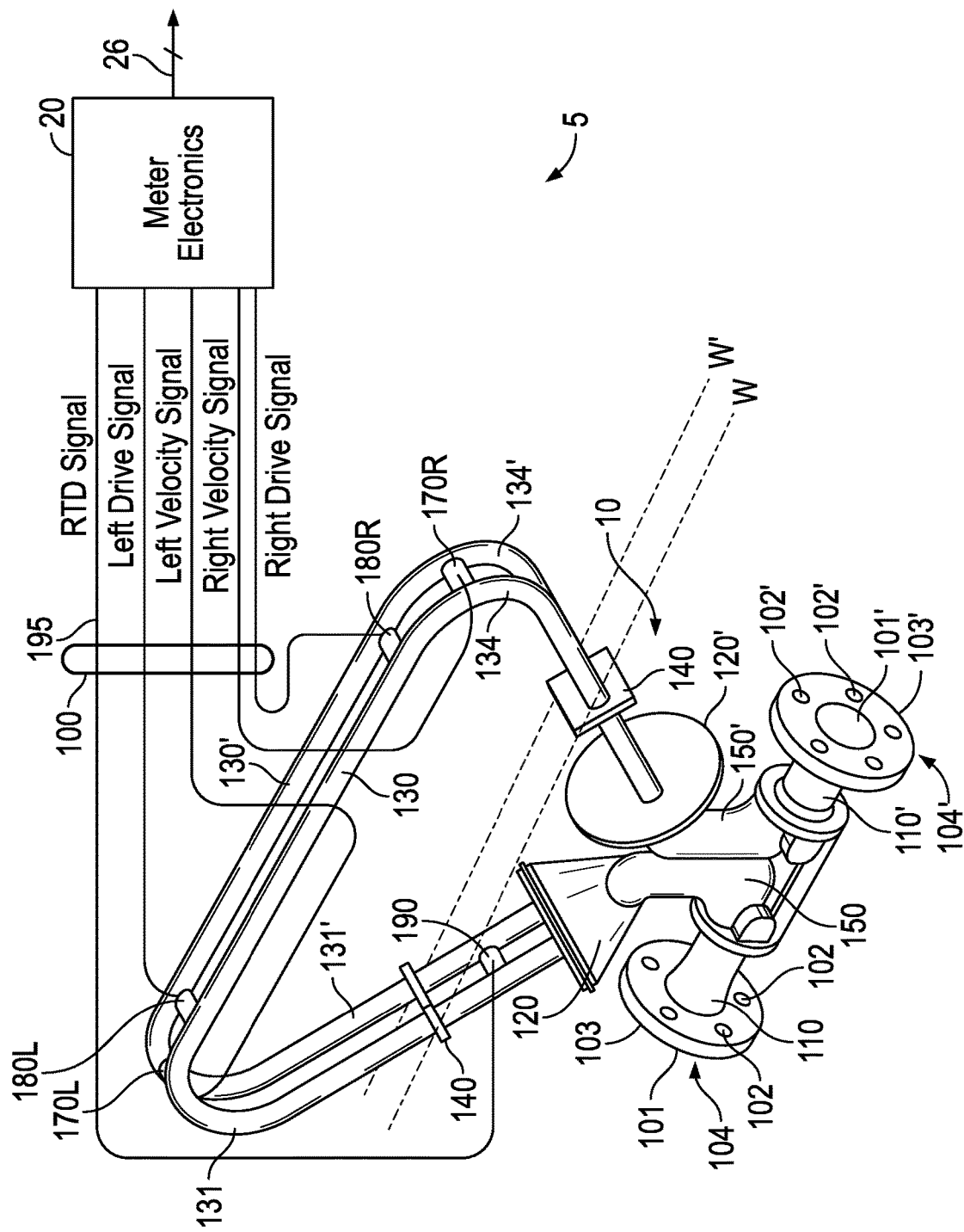
FIG. 1 illustrates a flowmeter comprising a meter assembly and meter electronics.

FIG. 1 shows a vibratory flowmeter 5 according to an embodiment. The flowmeter 5 comprises a sensor assembly 10 and meter electronics 20 coupled to the sensor assembly 10. The sensor assembly 10 responds to at least mass flow rate and density of a process material. The meter electronics 20 is connected to the sensor assembly 10 via leads 100 to provide density, mass flow rate, and temperature information over a communication link 26, as well as other information. A Coriolis flowmeter structure is described although it is apparent to those skilled in the art that the present invention could also be operated as a vibrating tube densitometer.

The sensor assembly 10 includes manifolds 150 and 150', flanges 103 and 103' having flange necks 110 and 110', parallel flow tubes 130 and 130', first and second drivers 180L and 180R, and first and second pickoff sensors 170L and 170R (for brevity, the drivers and pickoff sensors may herein be collectively referred to as "transducers"). The first and second drivers 180L and 180R are spaced apart on the one or more flow tubes 130 and 130'. In some embodiments, there is only a single driver. In addition, in some embodiments, the sensor assembly 10 may include a temperature sensor 190. The flow tubes 130 and 130' have two essentially straight inlet legs 131 and 131' and outlet legs 134 and 134' which converge towards each other at the flow tube mounting blocks 120 and 120'. The flow tubes 130 and 130' bend at two symmetrical locations along their length and are essentially parallel throughout their length. The brace bars 140 and 140' serve to define the axis W and the substantially parallel axis W' about which each flow tube oscillates. It should be noted that in an embodiment, the first driver 180L may be collocated with the first pickoff sensor 170L, the second driver 180R may be collocated with the second pickoff sensor 170R.

The side legs 131, 131', 134, 134' of the flow tubes 130 and 130' are fixedly attached to flow tube mounting blocks 120 and 120' and these blocks, in turn, are fixedly attached to the manifolds 150 and 150'. This provides a continuous closed material path through the sensor assembly 10.

When the flanges 103 and 103', having holes 102 and 102' are connected, via the inlet end 104 and the outlet end 104' into a process line (not shown) which carries the process material that is being measured, material enters an inlet end 104 of the flowmeter 5 through an orifice 101 in the flange 103 and is conducted through the manifold 150 to the flow tube mounting block 120. Within the manifold 150, the material is divided and routed through the flow tubes 130 and 130'. Upon exiting the flow tubes 130 and 130', the process material is recombined in a single stream within the manifold 150' and is thereafter routed to the outlet end 104' connected by the flange 103' having bolt holes 102' to the process line (not shown) via orifice 101'. The flow fluid can comprise a liquid. The flow fluid can comprise a gas. The flow fluid can comprise a multi-phase fluid, such as a liquid including entrained gases and/or entrained solids; or a gas including entrained liquids.

The flow tubes 130 and 130' are selected and appropriately mounted to the flow tube mounting blocks 120 and 120' so as to have substantially the same mass distribution, moments of inertia, and Young's modulus about the bending axes W-W and W'-W', respectively. These bending axes go through the brace bars 140 and 140'. Inasmuch as the Young's modulus of the flow tubes change with temperature, and this change affects the calculation of flow and density, the temperature sensor 190, which may be a resistive temperature detector (RTD), is mounted to a flow tube 130, 130' to continuously measure the temperature of the flow tube 130, 130'. The temperature-dependent voltage appearing across the temperature sensor 190 may be used by the meter electronics 20 to compensate for the change in the elastic modulus of the flow tubes 130 and 130' due to any changes in flow tube temperature. The temperature sensor 190 is connected to the meter electronics 20 by lead 195.

The flow tubes 130, 130' are typically driven by the driver 180L, 180R in opposite directions about the respective bending axes W and W' and at what is termed the first out of phase bending mode of the vibratory flowmeter 5. The driver 180L, 180R may comprise one of many well-known arrangements, such as a magnet mounted to the flow tube 130 and an opposing coil mounted to a proximate flow tube 130'. An alternating current is passed through the opposing coil to cause both flow tubes 130, 130' to oscillate. A suitable drive signal is applied by the meter electronics 20 to the driver 180L, 180R. Other driver devices are contemplated and are within the scope of the description and claims.

The meter electronics 20 receives sensor signals from the sensor assembly 10, and also produces a drive signal which causes a driver 180L, 180R to oscillate the flow tubes 130, 130'. Other sensor devices are contemplated and are within the scope of the description and claims.

The meter electronics 20 processes the left and right velocity signals from the pick-off sensors 170L, 170R in order to compute a flow rate, among other things. The communication link 26 provides an input and an output means that allows the meter electronics 20 to interface with an operator or with other electronic systems.

In one embodiment, the flow tubes 130, 130' comprise substantially U-shaped flow tubes, as shown. Alternatively, in other embodiments, the flowmeter 5 can comprise substantially straight flow tubes 130, 130'. Additional flowmeter shapes and/or configurations can be used and are within the scope of the description and claims.

The description of FIG. 1 is provided merely as an example of the operation of a flow metering device, and is not intended to limit the teaching of the present invention.

Figure 2:
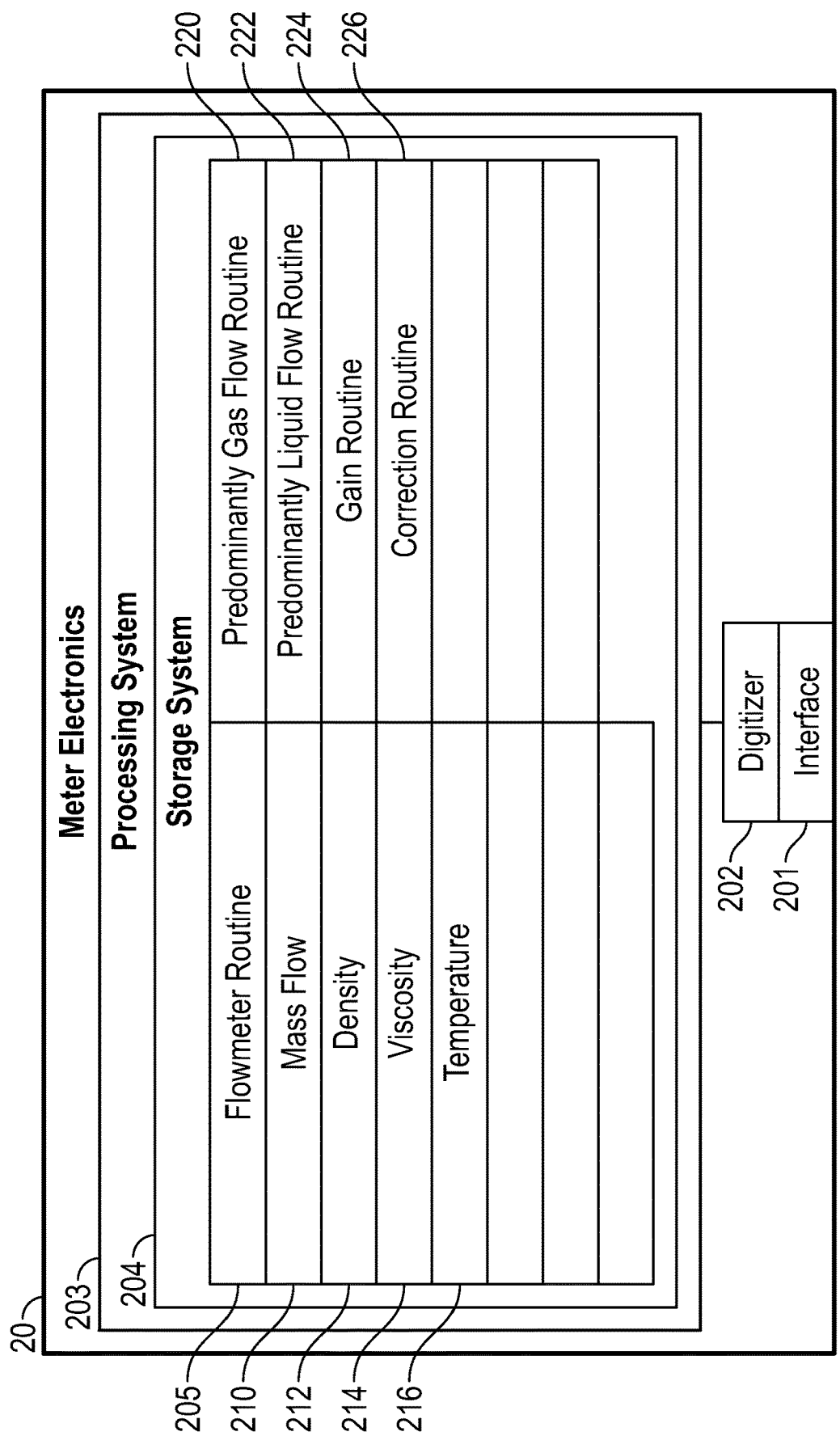
FIG. 2 shows a block diagram of the meter electronics according to an embodiment.

FIG. 2 illustrates meter electronics 20 of the flowmeter 5 according to an embodiment of the invention. The meter electronics 20 can include an interface 201 and a processing system 203. The meter electronics 20 receives transducer signals from the sensor assembly 10, such as pickoff sensor 170L, 170R signals, for example without limitation. The meter electronics 20 processes sensor signals in order to obtain flow characteristics of the flow material flowing through the sensor assembly 10. For example, the meter electronics 20 can determine one or more of a phase difference, a frequency, a time difference (Δt), a density, a mass flow rate, a strain, and a volume flow rate from the sensor signals. In addition, other flow characteristics may be determined in some embodiments.

The interface 201 receives the sensor signals from the transducers via the leads 100 illustrated in FIG. 1. The interface 201 can perform any necessary or desired signal conditioning, such as any manner of formatting, amplification, buffering, etc. Alternatively, some or all of the signal conditioning can be performed in the processing system 203.

In addition, the interface 201 can enable communications between the meter electronics 20 and external devices, such as through the communication link 26, for example. The interface 201 can be capable of any manner of electronic, optical, or wireless communication.

The interface 201 in one embodiment includes a digitizer 202, wherein the sensor signal comprises an analog sensor signal. The digitizer 202 samples and digitizes the analog sensor signal and produces a digital sensor signal. The interface/digitizer 201/202 can also perform any needed decimation, wherein the digital sensor signal is decimated in order to reduce the amount of signal processing needed and to reduce the processing time.

The processing system 203 conducts operations of the meter electronics 20 and processes flow measurements from the sensor assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The processing system 203 is configured to retrieve and execute stored routines in order to operate the flowmeter 5. The storage system 204 can store routines including a general flowmeter routine 205, a predominantly gas flow routine 220, a predominantly liquid flow routine 222, a gain routine 224, and correction routine 226. The processing system 203 can determine at least a magnitude, phase difference, time difference, and a frequency of transducer signals. Other measurement/processing routines are contemplated and are within the scope of the description and claims. The storage system 204 can store measurements, received values, working values, and other information. In some embodiments, the storage system may store any one or more of a mass flow (ṁ) 210, a density (ρ) 212, a viscosity (μ) 214, a temperature (T) 216, other values known in the art, and products thereof, for example without limitation. The flowmeter routine 205 can produce and store fluid and flow measurements. These values can comprise substantially instantaneous measurement values or can comprise totaled or accumulated values, and may also comprise databases and lookup tables. For example, the flowmeter routine 205 can generate mass flow measurements and store such measurements in the storage system 204. The flowmeter routine 205 can generate density measurements and store them in the storage system 204. Other measurements are contemplated to be similarly generated and stored in the storage system, as will be appreciated by one skilled in the art. The mass flow 210 and density 212 values are determined from the transducer response, as previously discussed and as known in the art. The mass flow 210 can comprise a substantially instantaneous mass flow rate value, can comprise a mass flow rate sample, can comprise an averaged mass flow rate over a time interval, or can comprise an accumulated mass flow rate over a time interval. The time interval may be chosen to correspond to a block of time during which certain fluid conditions are detected, for example, a liquid-only fluid state, or alternatively a fluid state including liquids and entrained gas. In addition, other mass flow quantifications are contemplated and are within the scope of the description and claims.

In an embodiment, flow is sensed by directly measuring the relative motion of the outlet 134, 134' (or inlet 131, 131') side of a flowtube 130, 130' with respect to the inlet 131, 131' (or outlet 134, 134') side of the same flowtube 130, 130'. During fluid flow, signal outputs typically have an amplitude that is a function of flow rate (which corresponds to the mode shape gaining complexity, i.e. inlet/outlet phase, due to flow). In related embodiments, combined signals from one or more transducers on the inlet side of a meter and the combined signals from one or more transducers on the outlet side of the meter are input into the meter electronics. A phase measurement may be derived from the inlet and outlet signals.

In some circumstances, such as for direct wellhead measurement, for example, the ability to continuously measure a well is desirable, as the information gleaned is vital for operational and management decisions. Unfortunately, often such measurements are difficult, for the presence of multiple components such as entrained gas, variable flow rates, and high watercuts render measurements unreliable.

In an embodiment, flow tube 130, 130' amplitude can be measured by the sensor assembly 10 via the pickoff sensor 170L most proximate the flowmeter 5 inlet. As this pickoff sensor's signal falls below a certain threshold, the uncertainty of the mass flow rate and the uncertainty of the mixture density is generally too great to be considered a reliable measurement. The threshold for which a signal is considered unreliable may be different for mass rate measurements and density measurements, for example. As a multiphase flow is produced through a Coriolis sensor, such as from an oil and gas well, there are often periods of non-measureable flow and periods of measureable, homogenous, flow. The measurable periods are typically characterized by low gas void fraction (GVF) flow in predominantly liquid flow and a low Lockhart-Martinelli (LM) parameter in wet gas flow. The LM is a dimensionless number used in two-phase flow calculations, and expresses the liquid fraction of a flowing fluid. See *Proposed Correlation of Data for Isothermal Two Phase Flow, Two Component Flow in Pipes* Lockhart, R. W., Martinelli, R. C.; Chem. Eng. Prog., Vol. 45. 1949, pp. 39-48, which is incorporated by reference herein. During these periods of relatively homogenous flow, the mass flow and density error may be low enough to be acceptable for generating reliable measurements. It should be noted that these periods would also correspond to flow tube 130, 130' amplitudes above a pre-determined threshold.

Figure 3:
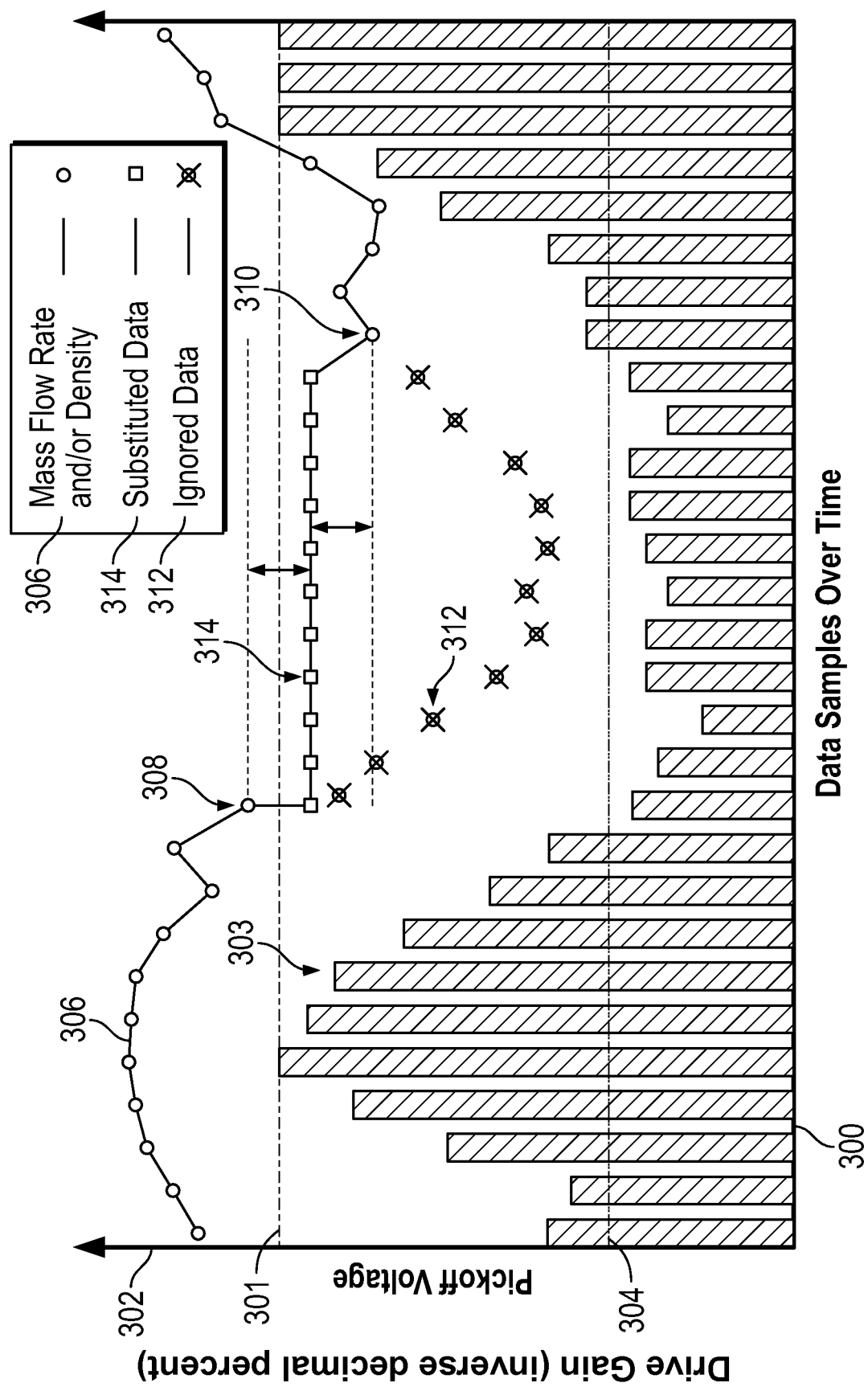
FIG. 3 illustrates a graph of an implementation of an embodiment.

Turning to FIG. 3, an illustration of a flowmeter 5 determining a mass flow rate or density through periods of non-homogenous flow according to an embodiment is presented. The x-axis 300 represents data samples taken over a course of time, while the y-axis 302 represents a pickoff sensor voltage or the inverse of drive gain, where drive gain is an inverse decimal percentage. Each data sample is represented by a bar 303. The reported mass flow rate and/or density is shown by line 306. A dashed line 304 indicates a pre-determined pickoff voltage threshold or inverse drive gain threshold. Starting from the origin, it is clear that the first ten data points have a voltage or inverse drive gain that is above the voltage or inverse drive gain threshold 304. However, the eleventh data point represents the first of eleven data points below the voltage or inverse drive gain threshold 304. The first of these corresponding mass flow rate and/or density values below the voltage or inverse drive gain threshold 304 is indicated by arrow 308, while the first data point after the mass flow rate and/or density value that corresponds with a data point above the voltage or inverse drive gain threshold 304 is indicated by arrow 310.

In an embodiment, the meter electronics 20 receives mass flow, density, temperature, and tube amplitude signals, for example without limitation, from the sensor assembly 10. A mass flow rate, and/or density is calculated. However, in an embodiment, mass flow and/or density readings that correspond to tube amplitudes or inverse drive gains below the operator-entered threshold(s) are ignored in calculations. In FIG. 3, this would correspond to the data points starting at the point indicated by arrow 308 to the data point prior to the point indicated by arrow 310. In an embodiment, the values for mass flow and density during these periods could be substituted by an operator-entered set value. In another embodiment, the values for mass flow and density during these periods may be estimated. In a related embodiment, an average mass flow and/or density is provided. For example, a value provided may be the average between the value immediately prior to when the measured transducer amplitude dipped below the predetermined voltage or inverse drive gain threshold 304 (point indicated by arrow 308) and the value when the measured transducer amplitude or inverse drive gain returned back above the predetermined voltage threshold 304 (point indicated by arrow 310). This is illustrated in FIG. 3, as the ignored data 312 is substituted by substitute data 314. These and other methods/calculations for averaging or substituting data are contemplated, and may be stored in meter electronics 20.

An embodiment is provided for accommodating situations of predominantly gas having an entrained liquid therein. As an example, for oilfield application, the entrained liquid in natural gas may be mostly water, mostly condensate (or crude oil), or a mixture of both. In an embodiment encompassing non-mixture cases, the solution noted above, and related to FIG. 3, is appropriate. For this type of wet gas flow, the meter electronics 20 may be configured to ignore multi-phase flow, and simply utilize substitute Coriolis values for periods where transducer amplitude or inverse drive gain readings are low.

In an embodiment, for example without limitation, the following equations may be utilized to determine the volume of the gas fraction and the volume of liquid fraction:

$$\dot{m} = ((\dot{V}_{gas} \cdot \rho_{gas}) + (\dot{V}_{liquid} \cdot \rho_{liquid})) \quad (1)$$

Where:
$\dot{m}$=mass flow rate
$\dot{V}_{gas}$=Volumetric flow rate of gas
$\rho_{gas}$=Density of gas
$\dot{V}_{liquid}$=Volumetric flow rate of liquid
$\rho_{liquid}$=Density of liquid $$GVF = \frac{\rho_B - \rho_{liquid}}{\rho_{gas} - \rho_{liquid}} \quad (2)$$

Where:
GVF=Gas void fraction
$\rho_B$=Bulk density $$GVF = \frac{\dot{V}_{gas}}{\dot{V}_{gas} + \dot{V}_{liquid}} \quad (3)$$

With reference to expressions (1)-(3), $\dot{m}$ and $\rho_B$ are values derived from the flowmeter 5. The $\rho_{gas}$ is derived from temperature, pressure, gas composition, and well-known American Gas Association (AGA) equations. The $\rho_{liquid}$ is known from empirical measurements. This leaves $\dot{V}_{gas}$, $\dot{V}_{liquid}$, and GVF as unknowns, which may therefore be solved for.

For an embodiment having primarily-liquid flow with entrained gas, it is possible to determine a mathematic relationship between pickoff voltage and/or drive gain and GVF directly by previous empirical testing. By using expressions (1) and (3), $\dot{V}_{gas}$, $\dot{V}_{liquid}$ may be solved for using this alternate method.

In a related embodiment, for wet gas flow situations, the following equations may additionally be utilized:

$$LM = \frac{\dot{m}_{liquid}}{\dot{m}_{gas}} \sqrt{\frac{\rho_{gas}}{\rho_{liquid}}} \quad (4)$$

Where:
LM=Lockhart-Martinelli parameter
$\dot{m}_{liquid}$=mass flow rate of liquid
$\dot{m}_{gas}$=mass flow rate of gas $$\dot{m} = \dot{m}_{liquid} + \dot{m}_{gas} \quad (5)$$

Utilizing expressions (4) and (5) in conjunction with expressions (1)-(3) allows, with prior testing of a Coriolis sensor, the utilization of LM. This known variable may therefore be used to determine the $\dot{m}_{gas}$ and $\dot{m}_{liquid}$. Typically, the $\rho_{gas}$ would be determined as above using temperature, pressure, gas composition, and AGA equations. The $\rho_{liquid}$ would be entered by the operator. As noted above, $\dot{m}$ is the mass flow rate as derived from the flowmeter 5. This yields two equations with two unknowns—$\dot{m}_{liquid}$ and $\dot{m}_{gas}$. In an embodiment, commonly used standard volume flow rates may be derived by dividing the mass rates by their base densities. This algorithm, utilizing the LM relationship for determining $\dot{m}_{liquid}$ and $\dot{m}_{gas}$ would be used in the case of predominantly-gas mixtures.

So that this multiphase measurement system can distinguish between predominantly-gas and predominantly-liquid flows, and still apply the correct empirical algorithms for the solution of determining the volume flows of liquid and gas, a simple relationship between density and Lockhart-Martinelli numbers, and density and GVF is utilized. In the case of predominantly gas, the measured Coriolis density would need to be below a certain value corresponding to the measureable upper value of LM established by empirical testing. This density would be dependent on the flowing pressure of the system.

In the case of predominantly-liquid flows, the relationship between the measured Coriolis density and the measureable upper threshold of GVFs must be determined empirically. This density would also be dependent on the flowing pressure of the system. If it is determined that the Coriolis density at the flowing pressure is outside of either of the two ranges of predominantly-gas and predominantly-liquid, then the empirical solutions cannot be used, and expressions (1)-(3) can be used to solve for the volume flow of liquid and the volume flow of gas.

In cases where the liquid is a mixture of hydrocarbon and water, the density of the liquid could be determined, in an embodiment, either by sampling and/or the use of a water cut analyzer that can measure three-phase flow. Then the oil flow rate and the water flow rate may be defined by:

$$\dot{V}_{oil} = \dot{V}_{liquid}(1-WC) \quad (6)$$

$$\dot{V}_{H_2O} = \dot{V}_{liquid} \cdot WC \quad (7)$$

Where:
$\dot{V}_{oil}$=volumetric oil flow rate
WC=water cut (volumetric fraction of the water volume ratio compared to the total volume)
$\dot{V}_{H_2O}$=volumetric water flow rate The water cut can be measured by a water cut analyzer. In an embodiment, the water cut analyzer is not affected by bubbles in liquid and/or can measure water cut in the mist phase of wet gas flow. Therefore, by using a water cut analyzer, $\rho_{liquid}$ (expressions (2) and (4)) may be more accurately determined by:

$$\rho_{liquid} = (1-WC) \cdot \rho_{oil} + (WC \cdot \rho_{H_2O}) \quad (8)$$

Where:
$\rho_{oil}$=oil density
$\rho_{H_2O}$=water density

Equations (6), (7), and (8) are merely examples of equations used in determining the amount of water and hydrocarbon in the liquid phase, and should in no way limit the embodiments to these particular equations. These and other equations are contemplated in the predominantly gas flow routine 220 and in the predominantly liquid flow routine 222.

In oil and gas-related embodiments having a predominantly liquid flow, there will typically be liquid hydrocarbon mixed with water in various ratios. Therefore, the use of some method of water cut measurement is typically relayed to meter electronics 20 to facilitate distinguishing the liquid fraction of the total flow. Thus, in an embodiment, a water cut analyzer is placed in communication via communication link 26 with the flowmeter.

In many of applications, the pressure is low enough that n g as may be assumed to be zero, in which case expression (2) would be substituted by:

$$GVF = \frac{\rho_{liquid} - \rho_B}{\rho_{liquid}} \quad (9)$$

In this case, the volume liquid flow rate may be determined by:

$$\dot{V}_{liquid} = \frac{\dot{m}}{\rho_{liquid}} \quad (10)$$

Therefore, the volume rate of gas would then be determined by:

$$\dot{V}_{gas} = \frac{\dot{V}_{liquid} \cdot GVF}{1-GVF} \quad (11)$$

Utilizing these equations, $\dot{V}_{oil}$ and $\dot{V}_{H_2O}$ are defined by equations (6) and (7). The standard volumes that are most commonly used may be computed from the actual volumes by knowledge of the oil, water, and gas densities and/or components at actual conditions. Then the densities at standard or base conditions may be determined using American Petroleum Institute (API) and AGA algorithms. The API algorithms yield the liquid volume correction factors (VCF), to convert actual volumes to standard volumes. The AGA algorithms may be employed to convert the actual gas volume to standard volume using temperature, pressure, and composition.

These are merely examples of equations used in flows having a predominantly liquid phase, and should in no way limit the embodiments to these particular equations. These and other equations are contemplated in the predominantly liquid flow routine 222.

As already noted, the mass flow and density measurements in two-phase flow are usually less than the actual values. Therefore, the variables in the above equations measured directly from the flowmeter 5 are subject to this effect. A relationship was discovered to exist between pickoff sensor 170L or drive gain, and mass flow and density under-read. In an embodiment, algorithms with the meter electronics 20 may iteratively correct the mass flow and density readings in real-time using these correction factors. This increases the accuracy of the Coriolis two-phase measurements.

Figure 4:
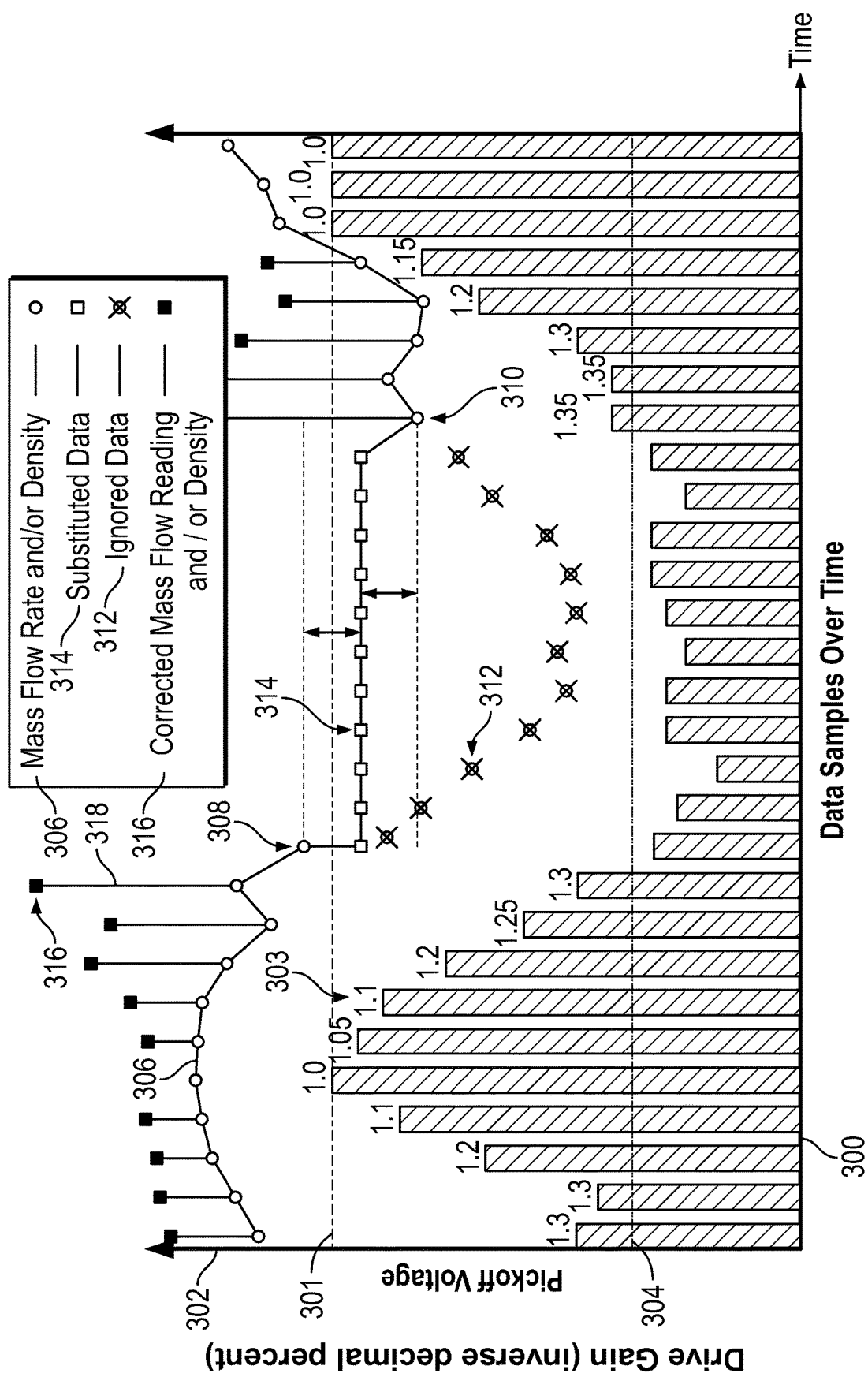
FIG. 4 illustrates a graph of an implementation of yet another embodiment.

Turning to FIG. 4, a mass flow correction factor corresponding to the pickoff sensor or inverse drive gain is illustrated. Elements in common with FIG. 3 share the same element number. The x-axis 300 represents data samples taken over a course of time, while the y-axis 302 represents a pickoff sensor voltage or inverse drive gain. Each data sample is represented by a bar 303. The reported mass flow rate and/or density is shown by line 306. A dashed line indicates a pre-determined pickoff voltage 304 or inverse drive gain threshold. For reference, a normal, single-phase pickoff voltage or inverse drive gain is shown by line 301. Starting from the origin, it is clear that the first ten data points have a voltage or inverse drive gain that is above the voltage or inverse drive gain threshold 304. However, the eleventh data point represents the first of eleven data points below voltage or inverse drive gain threshold 304. The first of these corresponding mass flow rate and/or density values below the threshold 304 is indicated by arrow 308, while the first data point after the mass flow rate and/or density value that corresponds with a data point above the threshold 304 is indicated by arrow 310.

Line 306 represents the mass flow and/or density reading, while a corrected mass flow and/or density reading is shown by each point 316. A correction factor is shown above each data point bar, and the implementation of the correction factor is illustrated by line 318. Therefore, the correlated correction factor may be applied to mass flow and/or density readings, and further adjusted to compensate for under-reported values that are the result of low pickoff voltage or low inverse drive gain percentage.

For the measurement of well performance in oil & gas well testing, for example, a separator is usually used to separate liquid from gas or separate oil from water and gas. In either case, the individual phases are measured separately with individual flowmeters. These separators are typically large, heavy pressure vessels having numerous level controls, safety valves, level sensors, control valves, piping, flowmeters, and interior devices to promote efficient separation. Such separators are usually prohibitively expensive, such that one separator must be shared by multiple wells for well testing. A manifold is usually provided that allows the wells to be tested one at a time, typically for a 24-hour test. The flowmeter 5 provided can measure the performance of a well at the wellhead, thus drastically reducing cost, associated labor, and overall complexity.

By monitoring each site individually, there are considerable advantages to the producers. The most obvious is the elimination of the separator and the maintenance that goes with it. Another advantage is the fact that all the wells in a field would be monitored simultaneously, so that real-time determinations can be made regarding strategies and tactics for efficient production and Enhanced Oil Recovery (EOR). EOR involves the injection of water, CO2, natural gas, surfactants, or steam; which can be expensive and must be applied at the right time with the right amount of media. Having real-time production data on an entire oilfield, for example without limitation, would give production and reservoir engineers valuable information on how to fine-tune their EOR. Operators would also have an advantage of early detection of wells that have developed problems, and can act quickly to remediate the problems. Another, advantage is that in a new field, the flow line gathering systems can incorporate a trunk-line-and-lateral design rather than having discrete flow lines to the test separator for each well. This saves capital costs on pipe, welding, trenching, and the real estate required.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

I claim:

1. A method for improving flowmeter reliability, wherein the flowmeter comprises at least one flow tube, at least one pickoff sensor attached to the flow tube, at least one driver attached to the flow tube, and meter electronics in communication with the at least one pickoff sensor and driver, comprising the steps of:
   vibrating at least one flow tube in a drive mode vibration with the at least one driver;
   receiving a sensor signal based on a vibrational response to the drive mode vibration from the at least one pickoff sensor;
   calculating at least one flow variable;
   measuring a pickoff sensor voltage;

determining whether the pickoff sensor voltage is below a predetermined voltage threshold; and
correcting the at least one flow variable during periods wherein the pickoff sensor voltage is below the predetermined voltage threshold, and wherein correcting the at least one flow variable during periods wherein the pickoff sensor voltage is below the predetermined voltage threshold comprises an averaging.

2. The method of claim 1, wherein the at least one flow variable comprises at least one of: mass flow, volume flow, density, and water cut.

3. The method of claim 2, wherein the water cut is measured with a water cut analyzer in communication with the meter electronics.

4. The method of claim 1, wherein the averaging comprises the steps of:
determining a point immediately prior to when the pickoff sensor voltage fell below the predetermined voltage threshold and determining a first at least one flow variable at this point;
determining a point wherein the pickoff sensor voltage returned above the predetermined voltage threshold and determining a second at least one flow variable at this point; and
calculating an average of the first and second at least one flow variables.

5. The method of claim 1, comprising the steps of:
correlating the pickoff sensor voltage with at least one of a mass flow rate under-read and a density under-read;
deriving an under-read correction factor based on the correlation; and
applying the under-read correction factor to the at least one flow variable.

6. The method of claim 1, comprising the steps of:
determining whether a fluid flow through the flowmeter is a multi-phase flow comprising predominantly a gas;
determining whether a fluid flow through the flowmeter is a multi-phase flow comprising predominantly a liquid;
applying a predominantly gas flow routine of the meter electronics if the fluid flow through the flowmeter is a multi-phase flow comprising predominantly a gas; and
applying a predominantly liquid flow routine of the meter electronics if the fluid flow through the flowmeter is a multi-phase flow comprising predominantly a liquid.

7. The method of claim 6, comprising the steps of:
measuring a mass flow rate and a bulk density with the flowmeter;
determining a gas density from a measured temperature, pressure, and gas composition;
empirically determining a liquid density; and
determining volumetric gas flow rate, volumetric liquid flow rate, and gas void fraction from the mass flow rate, the bulk density, the gas density, and the liquid density.

8. The method of claim 7, comprising the steps of:
determining a Lockhart-Martinelli parameter; and
determining a mass flow rate of a gas phase and a mass flow rate of a liquid phase.

9. The method of claim 7, comprising the steps of:
determining whether the liquid comprises water;
measuring liquid density with a water cut analyzer;
determining a volumetric flow rate of an oil; and
determining a volumetric flow rate of the liquid.

10. Meter electronics (20) for a flowmeter (5) configured to improve measurement reliability, wherein the flowmeter (5) comprises:
at least one flow tube (130, 130');
at least one pickoff sensor (170L, 170R) attached to the at least on flow tube (130, 130'); and
at least one driver (180L, 180R) attached to the flow tube (130, 130');
wherein the meter electronics (20) are in communication with the at least one pickoff sensor (170L, 170R) and the at least one driver (180L, 180R), and configured to:
vibrate at least one flow tube (130, 130') in a drive mode vibration with the at least one driver (180L, 180R);
receive a sensor signal based on a vibrational response to the drive mode vibration from the at least one pickoff sensor (170L, 170R);
calculate at least one flow variable;
measure a pickoff sensor (170L, 170R) voltage;
determine whether the pickoff sensor voltage is below a predetermined voltage threshold (304);
correct the at least one flow variable during periods wherein the pickoff sensor voltage is below the predetermined voltage threshold (304); and
average at least one flow variable during periods wherein the pickoff sensor voltage is below the predetermined voltage threshold (304).

11. The meter electronics (20) of claim 10, wherein the at least one flow variable comprises at least one of: mass flow, volume flow, density, and water cut.

12. The meter electronics (20) of claim 11, wherein the water cut is measured with a water cut analyzer in communication with the meter electronics (20).

13. The meter electronics (20) of claim 10, wherein the average comprises a calculated average of a first and a second flow variable, wherein:
the first flow variable is a pickoff sensor voltage value determined at a point immediately prior to when the pickoff sensor voltage falls below the predetermined voltage threshold (304); and
the second flow variable is a pickoff sensor voltage value determined at a point immediately after the pickoff sensor voltage returns above the predetermined voltage threshold (304).

14. The meter electronics (20) of claim 10, wherein the pickoff sensor voltage is correlated with at least one of a mass flow rate under-read and a density under-read, wherein the meter electronics (20) is configured to derive an under-read correction factor based on the correlation, and the under-read correction factor is applied to the at least one flow variable.

15. The meter electronics (20) of claim 10, configured to:
determine whether a fluid flow through the flowmeter (5) is a multi-phase flow comprising predominantly a gas; and
determine whether a fluid flow through the flowmeter (5) is a multi-phase flow comprising predominantly a liquid;
apply a predominantly gas flow routine (220) of the meter electronics (20) if the fluid flow through the flowmeter (5) is a multi-phase flow comprising predominantly a gas; and
apply a predominantly liquid flow routine (222) of the meter electronics (20) if the fluid flow through the flowmeter (5) is a multi-phase flow comprising predominantly a liquid.

16. The meter electronics (20) of claim 15, configured to:
measure a mass flow rate and a bulk density with the flowmeter (5);
determine a gas density from a measured temperature, pressure, and gas composition;

empirically determine a liquid density; and
determine a volumetric gas flow rate, a volumetric liquid flow rate, and a gas void fraction from the mass flow rate, the bulk density, the gas density, and the liquid density.

17. The meter electronics (20) of claim 16, configured to:
determine a Lockhart-Martinelli parameter; and
determine a mass flow rate of a gas phase and a mass flow rate of a liquid phase.

18. The meter electronics (20) of claim 16, configured to:
determine whether the liquid comprises water;
measure the liquid density with a water cut analyzer;
determine a volumetric flow rate of an oil; and
determine a volumetric flow rate of the liquid.

* * * * *